United States Patent
Sawyers et al.

(10) Patent No.: US 9,001,484 B2
(45) Date of Patent: Apr. 7, 2015

(54) POWER DELIVERY SYSTEMS AND METHODS

(75) Inventors: Thomas P. Sawyers, Hempstead, TX (US); Barry N. Carroll, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 199 days.

(21) Appl. No.: 13/882,395

(22) PCT Filed: Nov. 1, 2010

(86) PCT No.: PCT/US2010/054977
§ 371 (c)(1),
(2), (4) Date: Apr. 29, 2013

(87) PCT Pub. No.: WO2012/060811
PCT Pub. Date: May 10, 2012

(65) Prior Publication Data
US 2013/0222959 A1    Aug. 29, 2013

(51) Int. Cl.
*H02H 9/02*      (2006.01)
*H02H 7/20*      (2006.01)

(52) U.S. Cl.
CPC .. *H02H 9/02* (2013.01); *H02H 7/20* (2013.01)

(58) Field of Classification Search
CPC .................................. H02H 9/02; H02H 7/20
USPC ....................................................... 361/93.8
See application file for complete search history.

(56) References Cited

U.S. PATENT DOCUMENTS

| 6,243,276 | B1 | 6/2001 | Neumann | |
|---|---|---|---|---|
| 6,351,361 | B1 * | 2/2002 | Kawazu et al. | 361/103 |
| 6,498,460 | B1 | 12/2002 | Atkinson | |
| 6,928,565 | B2 * | 8/2005 | Watts et al. | 713/322 |
| 6,947,865 | B1 * | 9/2005 | Mimberg et al. | 702/130 |
| 7,199,558 | B2 | 4/2007 | Solie et al. | |
| 7,366,924 | B2 | 4/2008 | Hupman et al. | |
| 7,536,569 | B2 | 5/2009 | Montero et al. | |
| 8,296,587 | B2 * | 10/2012 | Paniagua et al. | 713/300 |
| 2006/0087815 | A1 * | 4/2006 | Lanni | 361/695 |
| 2007/0079153 | A1 | 4/2007 | Bain et al. | |
| 2007/0229024 | A1 | 10/2007 | Li et al. | |
| 2008/0123378 | A1 | 5/2008 | Chiang | |
| 2010/0302757 | A1 * | 12/2010 | Bennett, Jr. | 361/819 |

FOREIGN PATENT DOCUMENTS

| JP | 11-018430 A | 1/1999 |
|---|---|---|
| JP | 2009-106010 A | 5/2009 |
| KR | 2002-0012663 A | 2/2002 |

OTHER PUBLICATIONS

Machine translation in English of Kobayashi (JP 11-018730).*
International Searching Authority, International Search Report and Written Opinion, Appln No. PCT/US2010/054977, date of mailing Jul. 18, 2011, 10 p.

* cited by examiner

*Primary Examiner* — Scott Bauer
(74) *Attorney, Agent, or Firm* — Hewlett-Packard Patent Department (57) ABSTRACT

Power delivery systems and methods are provided. A power delivery system (100) can include a thermal device (140) disposed at least partially within the external power delivery device (110). The thermal device can be configured to output a first signal (150) corresponding to an internal temperature of the power delivery device when the internal temperature of the power delivery device exceeds a predetermined threshold.

14 Claims, 5 Drawing Sheets

POWER DELIVERY SYSTEMS AND METHODS

BACKGROUND OF THE INVENTION

Description of the Related Art

Many electronic devices make use of remote power adapters to convert locally available electrical energy to a standard format for use in powering or charging the batteries within the device. Manufacturers, in an effort to reduce costs, frequently ship electronic devices with power adapters closely matched to the "as manufactured" power consumption of the device. Consumers may modify or expand the electronic device, for example by attaching peripherals, thereby increasing the power consumption of the device beyond the "as manufactured" factory set-up. Such an increase in power consumption may result in a higher than expected power draw from the power adapter, potentially causing overheating and failure of the adapter.

BRIEF DESCRIPTION OF THE DRAWINGS

Advantages of one or more disclosed embodiments may become apparent upon reading the following detailed description and upon reference to the drawings in which.

DETAILED DESCRIPTION

Many devices make use of an external power adapter to convert local utility power to a regulated, fixed, voltage for powering the device or for charging batteries within the device. Such power adapters can contain numerous components, including one or more transformers to step down incoming line voltage, one or more rectification devices to convert local utility AC (alternating current) power to DC (direct current) power required by the device, and one or more power storage devices to dampen any variances in either the incoming or outbound power. Because the cost of the power adapter generally increases with rated capacity, manufacturers often provide a power adapter having only enough capacity to power the device in an "as manufactured" state, in other words, as the device left the manufacturer's facility.

Consumers have grown accustomed to quickly and easily upgrading the performance of devices by adding peripherals that draw power from the device itself. Coupling a sufficient number of such peripherals to a device can quickly overload the manufacturer supplied power adapter, leading to overheating and premature failure of the adapter. Additionally, localized heating of specific components within the power adapter may occur, deteriorating adapter performance and potentially jeopardizing the ability of the adapter to provide either the quantity or quality of power needed to power the device. The ability to throttle or otherwise restrict the performance of a remote electronic device attached to the power adapter can help reduce power output from the adapter, thereby reducing heating and any deleterious effects encountered as a result of the heating within the power adapter. The degree of throttling or power reduction applied to the device can correspond to the degree of overheating within the power adapter, however such throttling could be problematic, for example by unnecessarily impairing or affecting device operation, if it were to occur at temperatures at or below what is considered the "normal" operating temperature of the adapter.

A power delivery system is provided. A power delivery system can include a thermal device disposed at least partially within an external power delivery device. The thermal device can be configured to output a first signal corresponding to an internal temperature of the power delivery device when the internal temperature of the power delivery device exceeds a predetermined threshold.

A power delivery method is also provided. The power delivery method can include generating a first signal indicative of an internal temperature of an external power delivery device when the internal temperature of the device exceeds a predetermined threshold. The method can further include reducing the power consumption of a remote device coupled to the external power delivery device by an amount corresponding to at least one first signal parameter.

Another power delivery system is also provided. The power delivery system can include a negative temperature coefficient (NTC) thermistor disposed at least partially within an external power delivery device. The NTC thermistor can be disposed proximate to at least one internal component of the external power delivery device and configured to generate a first signal indicative of an internal temperature of the external power delivery device when the internal temperature exceeds a predetermined threshold.

Figure 1:
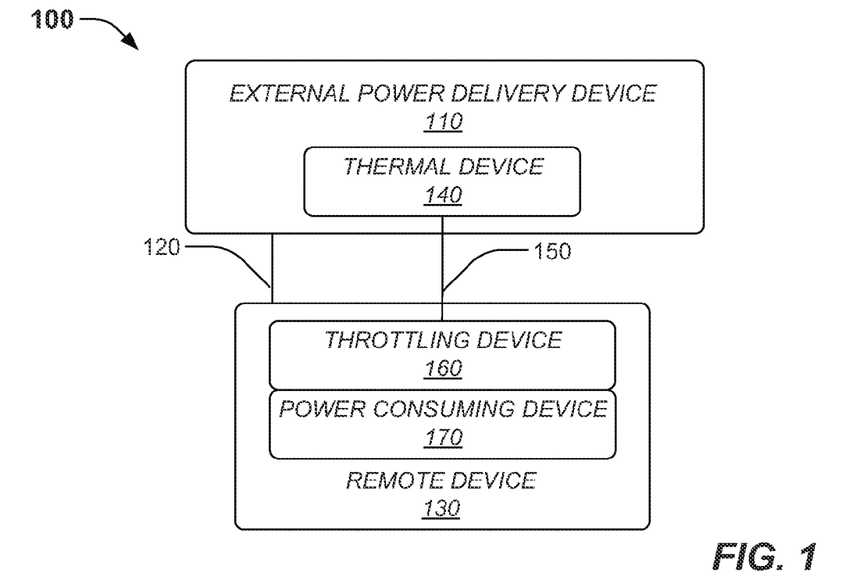
FIG. 1 is a block diagram depicting an illustrative thermally protected power adapter system, according to one or more embodiments described herein.

FIG. 1 is a block diagram depicting an illustrative thermally protected power adapter system 100, according to one or more embodiments. In some embodiments, the system 100 can include an external power delivery device 110 coupled via one or more conductors 120 to a remote device 130. A thermal device 140 can be disposed within the external power delivery device 110. The thermal device 140 can generate a first signal which increases commensurate with, i.e., is indicative of, an increase in an internal temperature within the external power delivery device 110. The first signal can be communicated to the remote device 130 via one or more conductors 150. At least one throttling device 160 and at least one power consuming device 170 can be disposed at least partially within the remote device 130. The throttling device 160 can be configured such that the power consumption of the power consuming device 170 can be reduced corresponding to to one or more first signal parameters received by the throttling device 160.

The external power delivery device 110 can include any number of devices, systems, or combination of systems and devices suitable for providing power to the remote device 130. The external power delivery device 110 can include multiple systems or devices, for example a power converter to convert incoming AC utility power to DC power using a combination of incoming power storage systems, transformer systems, rectifier systems, filtering systems, conditioning systems, and outbound power storage systems. The power delivery device 110 can provide power to a remote device 130 via the one or more conductors 120.

The remote device 130 can include any number of devices, systems, or combination of systems and devices drawing power from the external power delivery device 110. For example, the remote device 130 can include a portable computing device such as a laptop, tablet, or netbook computer. In some embodiments, the remote device 130 can be a display device, for example a digital versatile disk (DVD) or Blu-Ray® player and display device combination. One or more throttling devices 160 and one or more power consuming devices 170 can be at least partially disposed in, on, or about the remote device 130.

The remote device 130 can have one or more inputs disposed thereupon, for example one or more power inputs to accept power from the external power delivery device via the one or more conductors 120. The remote device 130 can also have one or more inputs to accept the first signal generated by the thermal device 140 via the one or more conductors 150. In some embodiments, the first signal and the power provided by the external power delivery device 110 to the remote device 130 can share one or more common conductors between the plurality of conductors 120 and the provided by conductors 150. In at least some embodiments, the remote device 130 can accept the input of both the power supply (via the plurality of conductors 120) and the first signal (via the one or more conductors 150) using a single, combined input.

The thermal device 140 can include any number of systems, devices, or any combination of systems and devices suitable for providing a signal via one or more conductors 150 when a component or housing temperature within the external power delivery device 110 exceeds a predetermined threshold. In at least some embodiments, the thermal device 140 can include one or more circuits incorporating at least one negative temperature coefficient (NTC) thermistor. The NTC thermistor incorporated within the thermal device 140 can include any device or component having an electrical resistance inversely related to the physical temperature of the thermistor, i.e., the resistance of the NTC thermistor decreases as the physical temperature of the thermistor increases. The thermal device 140 can also include one or more current control devices to enable or otherwise provide the first signal output when the temperature of the external power delivery device 110 or one or more components disposed therein exceeds a predetermined threshold.

In at least some embodiments, one or more first signal parameters can correspond to the temperature of the thermal device 140, for example a current source coupled to the thermal device 140 can flow a current through the thermal device to provide the first signal—in such an embodiment, the current, voltage, or frequency of the first signal can increase when the physical temperature of the thermal device 140 is increased. The first signal can be communicated to the remote device 130 via the one or more conductors 150. In at least some embodiments, all or a portion of the first signal can be communicated via the one or more conductors 150 to the throttling device 160 disposed in the remote device 130.

The throttling device 160 can be disposed in whole or in part within the remote device 130. The throttling device 160 can include any number of devices, systems or any combination of systems and devices suitable for controlling the power consumption or demand of at least one power consuming device 170 coupled to the throttling device 160.

In some embodiments, the throttling device 160 can include one or more controllers suitable for controlling, limiting, adjusting, or otherwise modulating one or more power consuming aspects of the power consuming device 170. For example, where the power consuming device 170 includes a processor, the throttling device 160 may include a controller adapted to reduce the clock speed of the processor in order to reduce the power consumption of the processor. In another example, where the power consuming device 170 includes a backlit liquid crystal display (LCD), the throttling device 160 may include a controller adapted to reduce the intensity of the backlight in order to reduce the overall power consumption of the LCD. In yet another example, where the power consuming device 170 includes random access memory (RAM), the throttling device 160 may include a controller adapted to reduce the refresh rate of the memory in order to reduce power consumption. While discussed in the context of a controller adapted to control a single function, the throttling device 160 can control a plurality of power consuming devices 170 to further decrease the power demand or consumption of the remote device 130.

As noted previously, the power consuming device 170 can include any device configured to exert a power demand on the external power delivery device 110. In some embodiments, more than one power consuming device 170 can be disposed within the remote device 130, for example the power consuming device 170 can include one or more processors or similar semiconductor devices, such as a central processing unit (CPU); a graphics processing unit (GPU); an expansion card; a volatile memory storage device; a non-volatile memory storage device; and a network interface device. In some embodiments, the power consuming device 170 can include one or more input/output devices, for example an audio output, an illuminator, such as an LCD backlight, a Light Emitting Diode (LED) display, or the like. In summary, the power consuming device 170 can include any number of devices, systems, or any combination of systems and devices in which the power consumption can be reduced without completely interrupting the operation or function of the power consuming device 170.

Figure 2:
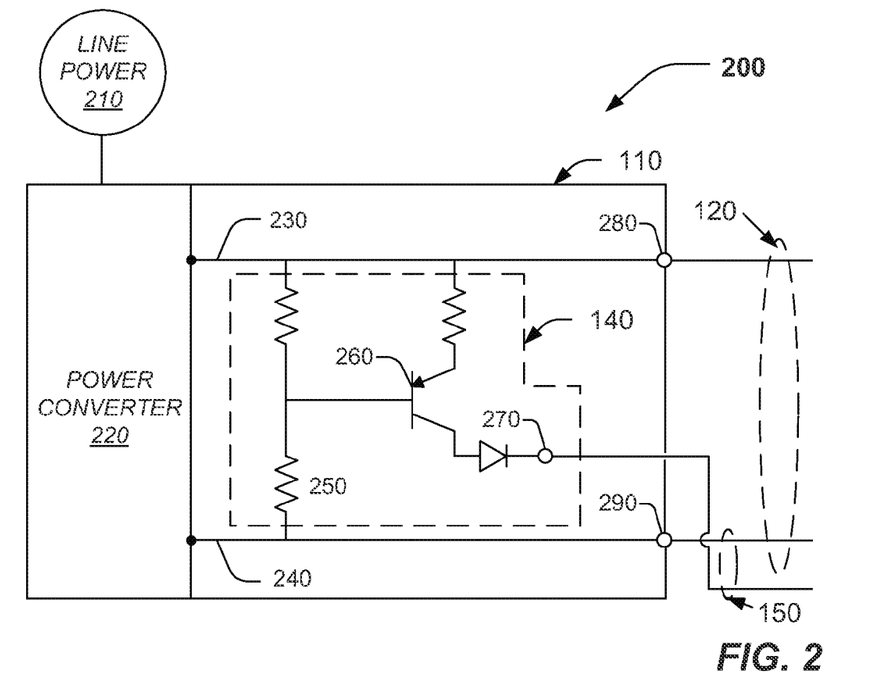
FIG. 2 is a schematic diagram depicting an illustrative thermal device, according to one or more embodiments described herein.

FIG. 2 is a schematic diagram depicting an illustrative external power delivery device 200, according to one or more embodiments. In one example, a power converter 220, incorporating an incoming electromagnetic interference (EMI) filter, line conditioner, one or more frequency shifting transistor networks, one or more transformers, one or more diode rectification networks, and one or more power storage networks can be disposed in whole or in part within the external power delivery device 200. The electromagnetic interference (EMI) filter external can smooth fluctuations or variances in incoming line power 210. The line conditioner can further clean and regulate the voltage and frequency of the incoming AC power. The one or more transistor networks can be used to increase the frequency of the incoming line power to more efficiently transform the line power to one or more lower voltages usable by the remote device 130. The frequency shifted line power can pass through one or more transformers to provide one or more reduced voltage AC supplies, for example a 12 volt, an 18.5 volt, or a 19 volt supply. The one or more diode networks can rectify the reduced voltage AC supply to provide one or more reduced voltage DC supplies. The one or more power storage networks can be used to smooth and regulate the delivery of the one or more reduced voltage DC supplies to the remote device 130. The reduced voltage DC power can be supplied via conductors 230 and 240. The reduced voltage DC power can be supplied to one or more remote device 130 via terminals 280 and 290. In some embodiments, the one or more conductors 120 can be coupled to the terminals 280 and 290 to convey the DC power to the remote device 130.

The thermal device 140 can be disposed at least partially within the external power delivery device 110, coupled to the reduced voltage DC power conductors 230 and 240. Among other components, the thermal device 140 can include one or more resistive thermal devices 250, for example a negative temperature coefficient (NTC) thermistor having an electrical resistance inversely related to the physical temperature of the resistive thermal device 250. The thermal device 140 can also include a current control device 260, for example a transistor, or similar, device to control the current flow to an output 270. In at least some embodiment, the current flow to output 270 can provide all or a portion of the first signal for transmission to the throttling device 160.

Because the electrical resistance of the resistive thermal device 250 is dependent upon the physical temperature of the device 250, the physical location of the device 250 within the external power delivery device 110 can permit the thermal monitoring of either specific components or surfaces within the entire power delivery device 110. Such operational flexibility can permit precise monitoring and corrective action based upon the temperature of one or more specific thermally sensitive devices or components disposed within the power delivery device 110. For example, the resistive thermal device 250 can be disposed proximate the one or more transformers disposed within the power delivery device 110 where the one or more transformers are deemed thermally sensitive. Other components within the power delivery device 110 can be similarly monitored using the resistive thermal device 250. In another example, the resistive thermal device can be disposed within the power delivery device enclosure in a location suitable for monitoring the internal temperature of a surface within the power delivery device 110.

As the temperature of the resistive thermal device 250 increases, the electrical resistance presented by the resistive thermal device 250 decreases. In some embodiments, the reduction in resistance of the resistive thermal device 250 can correspond to the increase in temperature experienced by the resistive thermal device 250. In at least some embodiments, at least a portion of the current flowing from a current source through the resistive thermal device 250 can be introduced to the base of a transistor, functioning as the current control device 260. When the current flow through the resistive thermal device 250 is low, one or more first signal parameters, for example first signal current, can be quite low. However, as greater quantities of current flow through the resistive thermal device 250 to the transistor 260 (i.e., as the electrical resistance of the resistive thermal device 250 decreases in response to an increase in temperature), one or more corresponding first signal parameters, such as current, can increase.

As the electrical resistance of the resistive thermal device 250 decreases, the increased current flowing through the resistive thermal device 250 can create a current flow through the current control device 260, thereby providing the first signal at output 270. As the temperature of the resistive thermal device 250 continues to increase, the resistance of the resistive thermal device will continue to decrease, thereby permitting successively greater current flow through the current control device 260 to the output 270. Where the current control device 260 is a transistor, the flow of current through the resistive thermal device 250 causes leakage of the current from the switching device 260 to the output 270 thereby providing at least a portion of at least one first signal parameter. Successively greater quantities of current supplied through the resistive thermal device 250 can provide a proportionately greater current at output 270. In some embodiments, the magnitude of the current at the output 270 can be proportionate to the physical temperature of the resistive thermal device 250.

Figure 3:
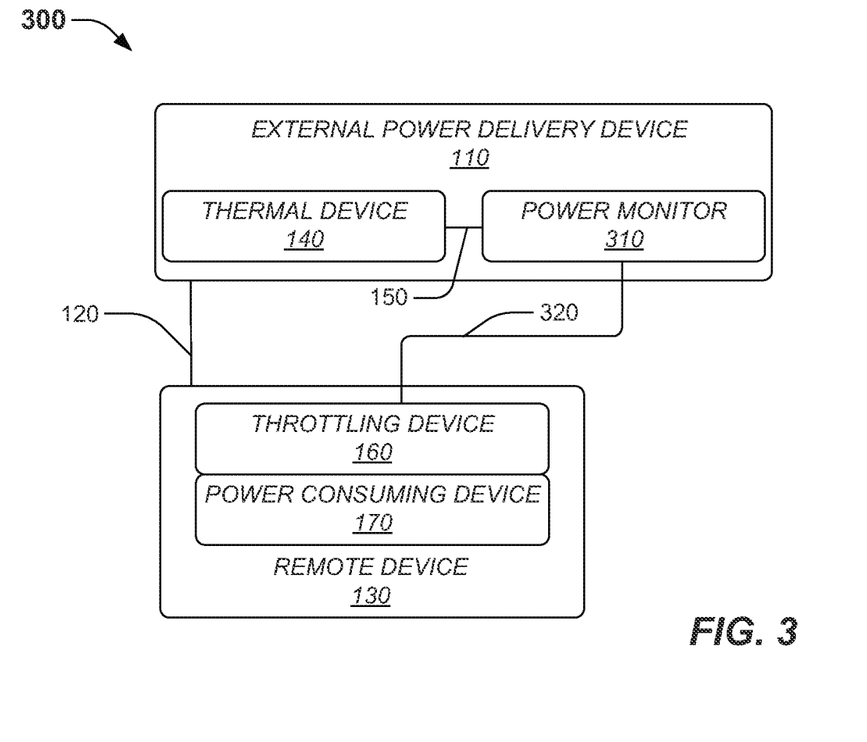
FIG. 3 is a block diagram depicting another illustrative thermally protected power adapter system, according to one or more embodiments described herein.

FIG. 3 is a block diagram depicting another illustrative thermally protected power adapter system 300, according to one or more embodiments. In at least some embodiments, a power monitor 310 can be at least partially disposed in the external power delivery device 110. In some embodiments, all or a portion of the first signal can be used as an input to the power monitor 310. In at least some embodiments, the power monitor 310 can be coupled to the throttling device 160 via one or more conductors 320.

The power monitor 310 can include any number of systems, devices, or any combination of systems and devices suitable for providing a second signal indicative of the power output of the external power delivery device 110 via the one or more conductors 320. In at least some embodiments, the power monitor 310 can provide the second signal only when the power output of the external power delivery device 130 exceeds a predetermined threshold, for example when the power output exceeds the rated maximum power output (e.g., the "as manufactured" power output) of the external power delivery device 110. The power monitor 310 can include one or more voltage sensors, one or more current sensors, one or more power sensors, or any combination thereof. The power monitor 310 can provide one or more signals indicative of the power output of the external power delivery device 110. For example, the power monitor 310 can output a second signal indicative of the power output of the external power delivery device 110 when the power output exceeds a predetermined, i.e., reference, threshold. In at least some embodiments, the second signal can be communicated to the remote device 130 via the one or more conductors 320.

The one or more conductors 320 can be coupled to the throttling device 160. In some embodiments, the first signal can be introduced to the power monitor 310 via the one or more conductors 150. Within the power monitor 310, the first signal can be used, in some embodiments, to adjust, alter, or affect the predetermined reference threshold within the power monitor 310. For example, in at least some embodiments, the power monitor 310 can include a reference threshold corresponding to a power output level where the external power delivery device 110 is able to meet 100% of the power requirements of the remote device 130. The first signal 150 can be used in some embodiments to bias, change, or otherwise adjust the reference threshold of the power monitor 310 such that the external power delivery device 110 can only provide a percentage of rated capacity less than 100%. Such an adjustment may provide an additional level of protection where an overheating condition develops within the external power delivery module 110 when the module is operating at 100% capacity or less.

In another example, the remote device 130 can place a power demand on the external power delivery device 110 of 130% of the rated power output, the power monitor 310 can provide a second signal 320 to the throttling device 160 to reduce the power consumption of the power consuming device 170 to a level that maintains the power output of the external power delivery device 110 at 100%. Should the temperature of the external power delivery device 110 continue to increase above normal operating limits, for any reason, such as when the ambient temperature is high, the thermal device 140 can provide a first signal 150 to the power monitor 310 to further reduce the power output from the external power delivery device 110 below 100% commensurate with the degree of heating experienced by the thermal device 140.

Such a reduction below 100% of rated capacity would ordinarily not occur using only the power monitor 310, since no temperature compensation is provided. However by using the first signal 150 to adjust the reference threshold of the power monitor 310, it becomes possible to limit the power output of the external power delivery device 110 to less than 100% of rated capacity.

Figure 4:
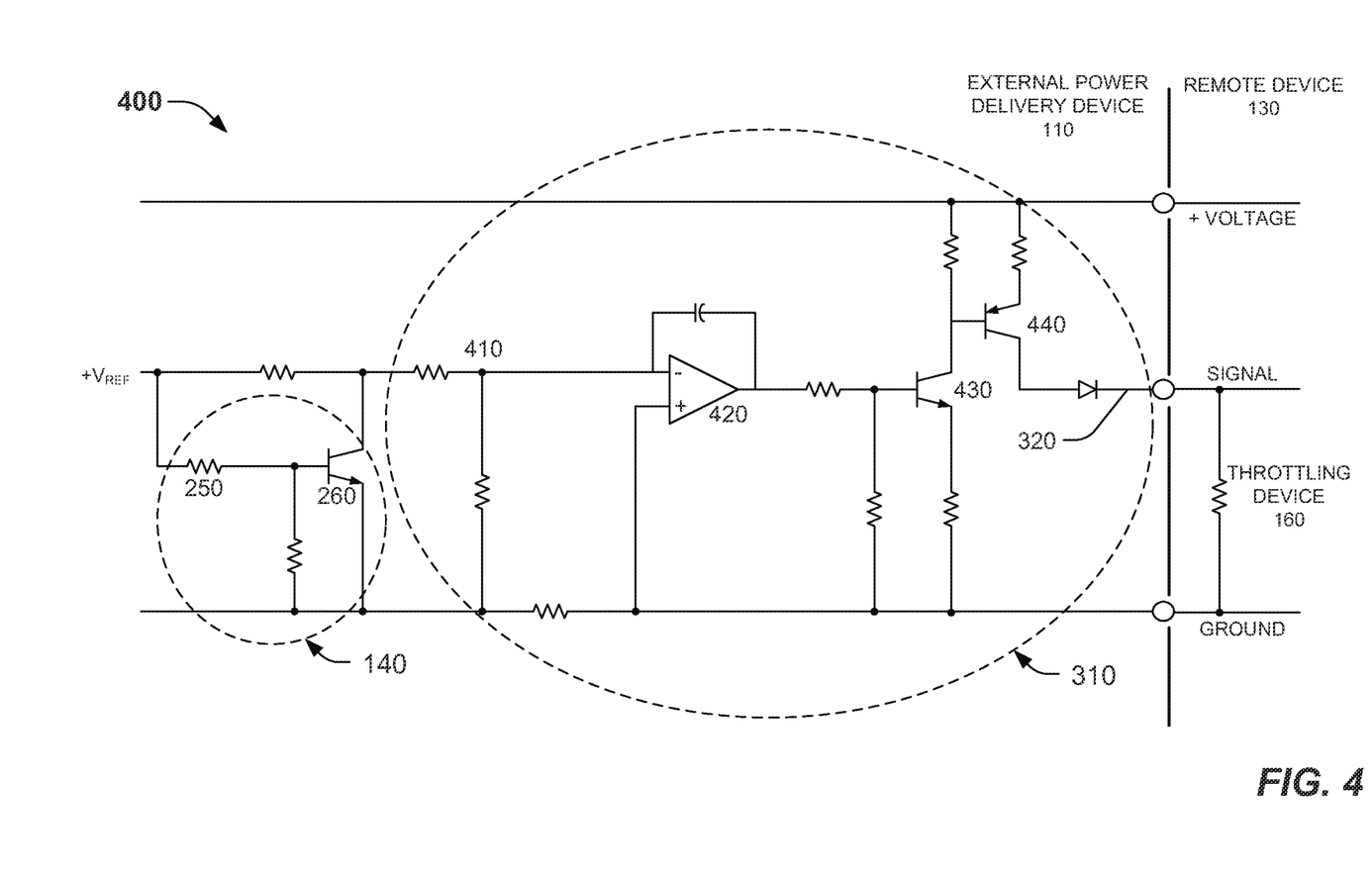
FIG. 4 is a schematic diagram depicting yet another illustrative thermally protected power adapter system, according to one or more embodiments described herein.

FIG. 4 is a schematic diagram depicting another illustrative thermally protected power adapter 400, according to one or more embodiments. The thermally protected power adapter 400 can, in some embodiments, include both a thermal device 140 and a power monitor 310. In some embodiments, for example as depicted in FIG. 4, the first signal provided by the thermal device 140 can be used to alter or adjust a reference threshold 410 within the power monitor 310.

In the absence of the thermal device 140, the power monitor 310 can compare the current output of the external power delivery device 110 against the reference threshold 410, for example a reference threshold set at the maximum design current of the external power delivery device 110. When the current output of the external power delivery device 110 exceeds the reference threshold 410, the current output from amplifier 420 will increase. An increase in amplifier 420 output current can cause the current control device 430 to provide an increased current flow to current control device 440. The current flowing through current control device 440 can provide at least a portion of the second signal transmitted to the remote device 130 via the one or more conductors 320. Any increase in current flow to the remote device 130 exceeding the current corresponding to reference threshold 410 can result in a corresponding increase in the second signal sent to the remote device 130. As the second signal increases, throttling device 160 can reduce the power consumption of at least one power consuming device 170. Reducing the power consumption of the remote device 130 reduces the current demand on the external power delivery device 110 thereby reducing the second signal. Such corrective action (generation of a second signal corresponding to the degree of overcurrent experienced by the external power delivery device 110, followed by the throttling device 160 further reducing power of the power consuming device 170) will continue to occur until the power demand of the remote device decreases to a level at or below the reference threshold 410.

Combining the power monitor 310 with a thermal device 140 provides the capability for temperature compensating the reference threshold 410. Such compensation can provide, for example, the capability to reduce the current output of the device 110 after the device has operated at or near 100% capacity for an extended period at elevated ambient temperature. While protection using the power monitor 310 alone can prevent extended use of the external power delivery device 110 above 100% capacity at elevated ambient temperatures, the power monitor 310 may not, in and of itself, protect against extended operation of the external power delivery device 110 at or near the maximum rated power delivery. Such extended operation at or near the maximum rated power delivery at elevated ambient temperatures can result in heating and potential premature failure of the external power delivery device 110. The addition of a thermal device 140 to the external power delivery device 130 can provide a temperature compensation capability to the reference threshold 410, thereby permitting the reduction of the power output of the external power delivery device 110 based upon both the power demand presented by the remote device 130 and the temperature of the external power delivery device 110.

In some embodiments, the first signal 150 provided by the thermal device 140 can be coupled to the power monitor 310 to provide a temperature and power compensated second signal to the remote device 130. The resistive thermal device 250 can be disposed within the external power delivery device 110 proximate a surface or one or more thermally sensitive components. As the temperature within the external power delivery device 110 increases, the resistance of the resistive thermal device 250 will decrease. The reduced resistance of the resistive thermal device 250 can increase the flow to the current control device 260, thereby creating a shunt upstream of the reference threshold 410. The presence of the shunt through the current control device 260 decreases the reference threshold 410 by an amount corresponding to the physical temperature of the resistive thermal device 250. As the physical temperature of the resistive thermal device 250 is reduced, for example by reducing the current flow to the remote device 130, the resistance within the shunt through the current control device 260 will increase, eventually eliminating the shunt and restoring the reference threshold 410 to the original, pre-shunt, value.

In one prophetic example, the external power delivery device can be rated for a full load (i.e., current demand from the remote device 130) of 4.5 amps (A). Operation of the remote device 130 at a demand of 4.5 A would therefore not exceed the reference threshold 410 and the remote device 130 would receive the full 4.5 A capacity of the external power delivery device 110. However, extended operation of the remote device 130 at the full 4.5 A load may cause unacceptable heating of one or more components within the external power delivery device 110, for example one or more transformers. By disposing the thermal device 140 proximate the transformer, the resistance of the resistive thermal device 250 will decrease by an amount corresponding to the increase in temperature experienced by the transformer. The reduced resistance presented by the resistive thermal device 250 permits the flow of current through the current control device 260, thereby establishing the shunt which reduces the reference threshold 410, to a value corresponding to less than 4.5 A. The reduction in the reference threshold 410 permits the amplifier 420 to provide a current flow to the current control device 430 and thence to current control device 440. The current flowing through current control device 440 can provide at least a portion of the second signal, transmitted to the external remote device 130 via the one or more conductors 320. As the temperature of the resistive thermal device 250 increases, current flow through the current control device 260 can increase, thereby causing a corresponding greater reduction in the reference threshold 410 via the shunt established through the current control device 260.

Figure 5:
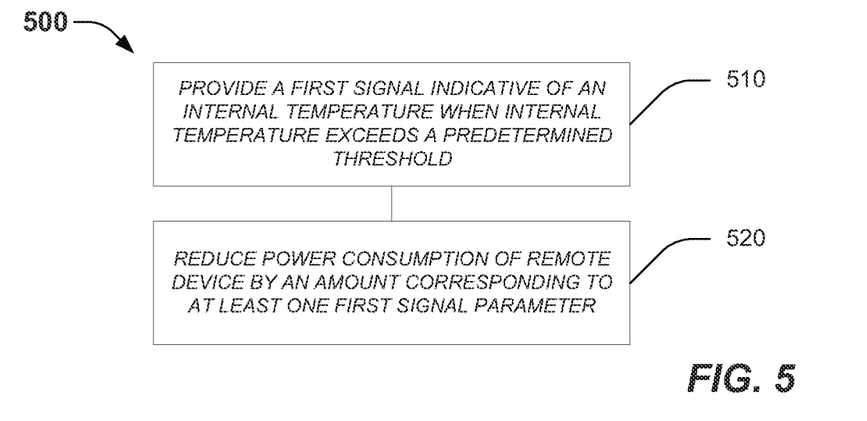
FIG. 5 is a flow diagram depicting an illustrative thermally protected power adapter method, according to one or more embodiments described herein.

FIG. 5 is a flow diagram depicting an illustrative thermally protected power adapter method 500, according to one or more embodiments. As the remote device 130 begins drawing power from the external power delivery device 110, the temperature of one or more components within the external power delivery device 110 can begin to increase. As the temperature within the external power delivery device 110 increases, one or more operating characteristics of the external power delivery device 110 may be compromised, for example the ability to deliver power within a specified voltage range may be compromised. When the power delivered by the power delivery device 110 is compromised, the operation of the remote device 130 can be adversely impacted.

Responsive to an increase in an internal temperature within an external power delivery device 110, the method 500 can include generating a first signal indicative of the increase in internal temperature when the temperature exceeds a predetermined threshold at 510. The threshold can, for example, be set at a temperature where the performance of the external power delivery device 110 remains within established, i.e., safe, limits. In at least some embodiments, when the external power delivery device 110 is operating at a temperature less than the threshold temperature, the first signal can be minimal or absent.

As the temperature within the external power delivery device 110 increases, the resistance of the resistive thermal device 250 can decrease, and the resultant increased current flow therethrough can increase the current flow through the current control device 260. As current flows through the current control device 260, the first signal can be communicated to the throttling device 160 via the one or more conductors 150. At least one first signal parameter, for example signal current, signal voltage, or signal frequency can increase commensurate with the internal temperature of the external power delivery device 110. For example, where the thermal device 140 includes an NTC thermistor to generate the first signal, the first signal current can increase as the electrical resistance of the NTC thermistor decreases in response to escalating temperatures within the external power delivery device 110.

To limit the temperature increase within the external power delivery device 110, the throttling device 160 can reduce the power consumption of the power consuming device 170 by an amount corresponding to one or more first signal parameters at 520. For example, where the remote device 130 is a tablet computer, the central processing unit (CPU) disposed within the tablet computer may represent one of the power consuming devices 170. The throttling device 160 can include a controller disposed within the tablet computer configured to adjust the clock speed of the CPU. In response to the over-temperature condition within the external power delivery device 110, the thermal device 140 can provide a first signal corresponding to the magnitude of the over-temperature event. In response to the receipt of the first signal, the controller (throttling device 160) can reduce the clock speed of the CPU (power consuming device 170) within the tablet computer (remote device 130) by an amount corresponding to first signal current. The reduction in CPU clock speed can reduce the overall power consumption of the tablet computer, reducing the demand on the external power delivery device 110, thereby permitting a gradual cooling of the external power delivery device, or preventing the temperature of the external power delivery device from rising above a predetermined level.

Figure 6:
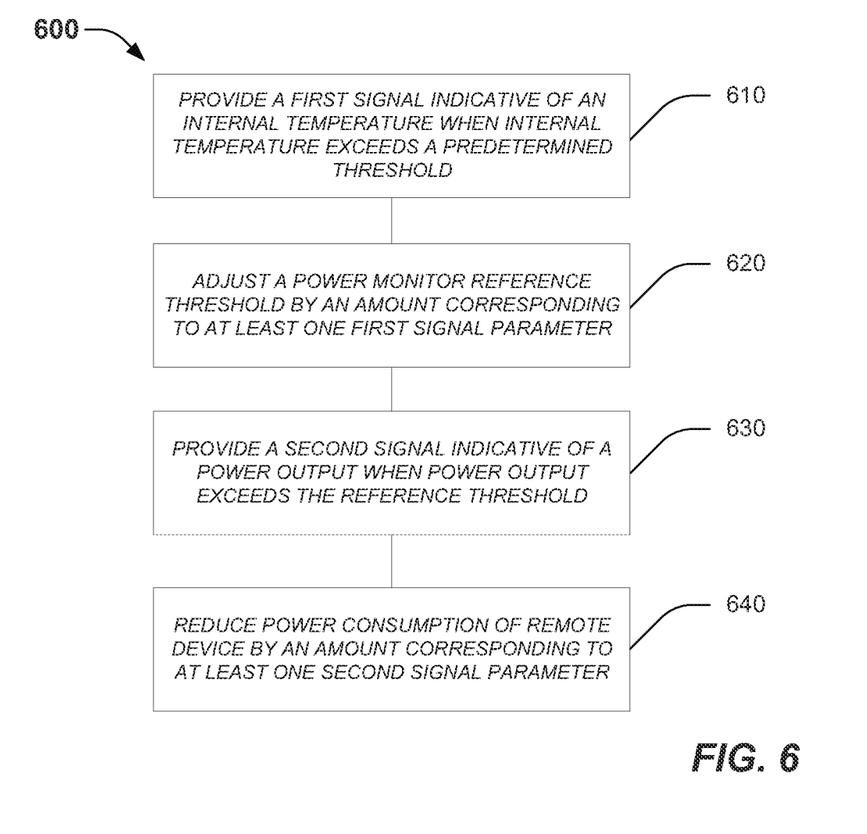
FIG. 6 is a flow diagram depicting another illustrative thermally protected power adapter method, according to one or more embodiments described herein.

FIG. 6 is a flow diagram depicting another illustrative thermally protected power adapter method 600, according to one or more embodiments. The method depicted in FIG. 6 incorporates both thermal and power monitoring features, based upon the use of a thermal device 140 and a power monitor 310 within the external power delivery device 110. The power monitor 310 can measure one or more power parameters (e.g., current, voltage, or power) of the power supplied to the remote device 130. Responsive to both the temperature of the external power delivery device 110 and the one or more power parameters, a second signal, related to both temperature and power can be provided to the remote device 130. In some embodiments, all or a portion of the second signal can be provided to the throttling device 160 via the one or more conductors 320. In at least some embodiments, the second signal can be provided by the power monitor 310 only when the one or more measured parameters exceed a predetermined threshold, for example when the power output of the external power delivery device 110 exceeds the rated power delivery capacity.

In some embodiments, a thermal device 140 disposed within the external power delivery device 110 can provide a first signal indicative of an internal temperature within the power delivery device 110 at 610. In at least some embodiments, the thermal device 140 can include one or more current control devices 260 such as a transistor configured to maintain a low first signal current until the temperature of the resistive thermal device 250 begins to increase. In other embodiments, the current control device 260 can be used as a shunt to alter, adjust, or otherwise affect the reference threshold 410 of the power monitor 310. As greater quantities of current flow through the resistive thermal device 250 to the transistor 260 (i.e., as the electrical resistance of the resistive thermal device decreases in response to an increase in temperature), one or more corresponding first signal parameters, such as current, can increase.

In some embodiments, at least a portion of one or more first signal 150 parameters can be used to bias, adjust, or otherwise influence the reference threshold 410 of the power monitor 310 at 620. For example, when the first signal 150 parameters are minimal (i.e., corresponding to a relatively low internal temperature within the external power delivery device 110) the reference threshold 410 can be set to 100% (i.e., full rated capacity) of the capacity of the external power delivery device 110. As the physical temperature of the thermal device 140 increases, the reference threshold 410 within the power monitor 310 can be biased downward to correspond to less than 100% of the capacity of the external power delivery device 110.

In some embodiments, at 630 the power monitor 310 can provide a second signal 320 when one or more external power delivery device parameters exceeds the reference threshold 410. In some embodiments, the one or more second signal parameters can correspond to the magnitude by which the measured parameter exceeds the reference threshold 410. For example, where the external power delivery device 110 is an AC power adapter and the remote device 130 is a laptop computer, the power monitor 310 can measure the power delivered by the AC power adapter (external power delivery device 110) to the laptop computer (remote device 130). If the AC power adapter (external power delivery device 110) has a rated capacity of 90 watts, when the demand presented by the laptop computer (remote device 130) exceeds 90 watts, the power monitor will transmit a second signal to the throttling device 160. One or more second signal parameters, for example the second signal current, can correspond to the magnitude of the over power condition, for example the current of the second signal may be 0 milliamps (mA) at 90 watts (W) (i.e., the rated capacity of the adapter), 0.1 mA at 100 W power demand, and 0.2 mA at 110 W power demand.

Upon receiving the second signal, the throttling device 160 can reduce the power consumption of the power consuming device 170 by an amount corresponding to at least one second signal 320 parameter at 520. For example, the laptop computer (remote device 130) can include a power consuming device 170 in the form of a graphical processing unit (GPU) and a throttling device 160 in the form of a controller configured to adjust the dock speed of the GPU. When the power demand exerted by the laptop computer (remote device 130) exceeds the rated capacity of the AC adapter (external power delivery device 110), the power monitor in the AC adapter can begin transmitting a second signal to the controller (throttling device 160). Upon receipt of the second signal, the controller (throttling device 160) can begin slowing GPU clocking (power consuming device 170) in order to reduce the power consumption of the GPU by an amount proportionate to the magnitude of one or more second signal parameters. The reduction in GPU (power consuming device 170) clock speed can reduce the overall power demand presented to the AC adapter (external power delivery device 110) by the laptop computer (remote device 130).

Figure 7:
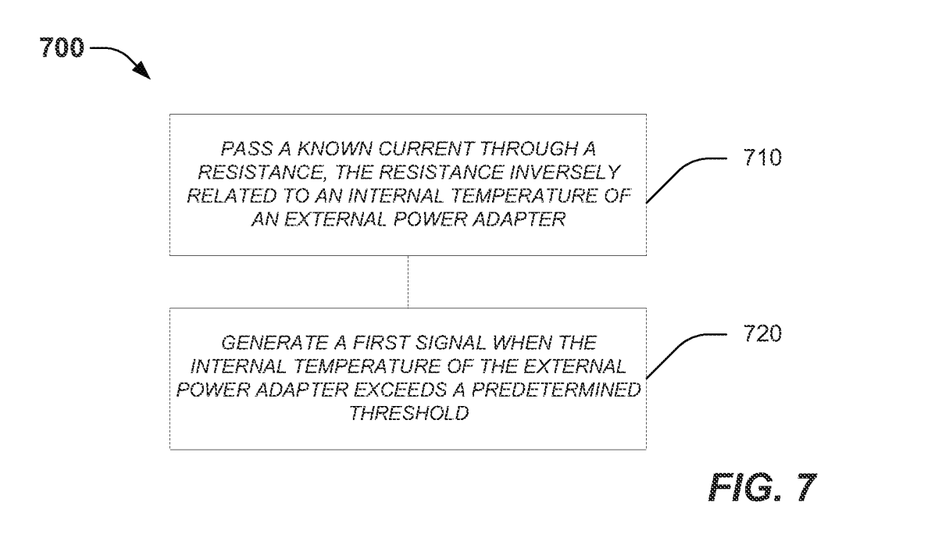
FIG. 7 is a flow diagram depicting yet another illustrative thermally protected power adapter method, according to one or more embodiments described herein.

FIG. 7 is a flow diagram depicting yet another illustrative thermally protected power adapter method 700, according to one or more embodiments. In at least some embodiments, the thermal device 140 can include a negative temperature coefficient (NTC) thermistor 250. The electrical resistance of the NTC thermistor 250 decreases when the physical temperature of the thermistor increases. Consequently, any current passed through the NTC thermistor 250 will tend to increase as the temperature of the NTC thermistor increases. In at least some embodiments, the relationship between temperature and electrical resistance can be used to generate at least a portion of the first signal.

For example, a known current can be passed through an NTC thermistor 250 disposed at least partially within an external power delivery device 110 at 710. In at least some embodiments, the NTC thermistor 250 can be coupled to a current control device 260, for example a transistor. As the temperature continues to increase within the external power delivery device 110, the current flow through the NTC thermistor 250 can increase due to the decreasing resistance presented by the thermistor, thereby increasing the current flow to the base of the transistor 260.

When the temperature reaches a predetermined value, the current flow through the NTC thermistor 250 can cause the current control device 260 (i.e. transistor 260) to enter the active region. The activation of the current control device 260 can permit the current to provide a first signal at terminal 270 at 720. The first signal can be communicated from terminal 270 to the remote device 130 via the one or more conductors 150.

What is claimed is:

1. A power delivery system comprising:
   a thermal device disposed at least partially within an external power delivery device, the thermal device configured to output a first signal having at least one parameter indicative of an internal temperature of the power delivery device when said internal temperature exceeds a predetermined threshold; and
   a power monitor to provide a second signal having at least one parameter indicative of a power output of the external power delivery device when the power output exceeds a level corresponding to a reference threshold, the reference threshold inversely related to the first signal.

2. The system of claim 1, further comprising:
   a remote device coupled to the external power delivery device via one or more conductors;
   a throttling device to receive at least a portion of the first signal via one or more conductors disposed at least partially within the remote device; and
   a power consuming device coupled to the throttling, device and disposed at least partially within the remote device.

3. The system of claim 1, the thermal device comprising:
   a variable resistance for providing an electrical resistance inversely related to the internal temperature of the external power delivery device, and
   a current generator for providing at least a portion of the first signal by passing a current through the variable resistance.

4. The system of claim 1, wherein:
   the thermal device is disposed proximate to an internal component disposed within the external power delivery device; and
   the internal component is selected from the group of components consisting of an incoming power storage system, a transformer system, a rectifier system, a regulator system, and an outbound power storage system.

5. The system of claim 2, wherein the throttling device to reduce the power consumption of power consuming device by an amount related to the at least one first signal parameter.

6. The system of claim 2, the throttling device to reduce the power consumption of power consuming device by an amount related to the at least one second signal parameter.

7. A method, comprising:
   generating via a thermal device a first signal having at least one parameter indicative of an internal temperature of an external power delivery device when said internal temperature exceeds a predetermined threshold;
   reducing the power consumption of a remote device coupled to the external power delivery device by an amount related to the at least one first signal parameter;
   measuring a power output of the external power delivery device;
   generating a second signal having at least one parameter indicative of the power output of the external power delivery device when the power output exceeds a level corresponding to a reference threshold, the reference threshold inversely related to the first signal; and
   reducing the power consumption of the remote device by an amount corresponding to the at least one second signal parameter.

8. The method of claim 7, wherein generating the first signal comprises:
   passing a known current through a variable resistance device having an electrical resistance inversely related to the internal temperature of the external power delivery device.

9. The method of claim 7, wherein reducing the power consumption of the remote device comprises:
   throttling at least one power consuming device disposed signal parameter.

10. The method of claim 7, wherein reducing the power consumption of the remote device comprises;
    throttling at least one power consuming device disposed within the remote device responding at least in part to at least one second signal parameter.

11. The method of claim 7, wherein generating a first signal indicative of an internal temperature of an external power delivery device comprises:
    measuring a temperature of at least one internal component disposed within the external power delivery device using a negative temperature coefficient (NTC) thermistor disposed proximate the at least one internal component.

12. A power delivery system, comprising:
    thermal device including a negative temperature coefficient (NTC) thermistor, the thermal device disposed proximate to at least one internal component of an external power delivery device and configured to generate a first signal having at least one parameter indicative of an internal temperature of the external power delivery device when the internal temperature exceeds a predetermined threshold; and
    a power monitor configured to generate a second signal having at least one parameter indicative of a power output of the external power delivery device, when the power output exceeds a level corresponding to a reference threshold, the reference threshold inversely related to the first signal.

13. The system of claim 12, further comprising:
    a remote device coupled to the external power delivery device; and a throttling device coupled to a power consuming device, disposed at least partially within the remote device;
the throttling device configured to accept the input of the second signal and to reduce the power consumption of the power consuming device corresponding to the magnitude of the at least one first signal parameter and the at least one second signal parameter.

14. The system of claim 12, further comprising:
a remote device coupled to the external power delivery device; and
a throttling device coupled to a power consuming device, disposed at least partially within the remote device;
the throttling device configured to accept the input of the first signal and to reduce the power consumption of the power consuming device corresponding to the magnitude of the at least one first signal parameter.

* * * * *

UNITED STATES PATENT AND TRADEMARK OFFICE
CERTIFICATE OF CORRECTION

| | | |
|---|---|---|
| PATENT NO. | : 9,001,484 B2 | Page 1 of 1 |
| APPLICATION NO. | : 13/882395 | |
| DATED | : April 7, 2015 | |
| INVENTOR(S) | : Thomas P. Sawyers et al. | |

It is certified that error appears in the above-identified patent and that said Letters Patent is hereby corrected as shown below:

In the Claims

In column 11, line 53, in Claim 2, delete "throttling," and insert --throttling--, therefor.

Signed and Sealed this
Twenty-ninth Day of September, 2015

Michelle K. Lee
*Director of the United States Patent and Trademark Office*